(12) United States Patent
Liu et al.

(10) Patent No.: US 11,044,599 B2
(45) Date of Patent: Jun. 22, 2021

(54) CONNECTION METHOD, CONFIGURATION UPDATING METHOD, CONTROL PLANE DEVICE, AND USER PLANE DEVICE (71) Applicant: ZTE CORPORATION, Guangdong (CN)

(72) Inventors: Yang Liu, Shenzhen (CN); Yin Gao, Shenzhen (CN); He Huang, Shenzhen (CN); Li Yang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 16/741,503

(22) Filed: Jan. 13, 2020

(65) Prior Publication Data
US 2020/0154268 A1 May 14, 2020

Related U.S. Application Data (63) Continuation of application No. PCT/CN2018/096513, filed on Jul. 20, 2018.

(30) Foreign Application Priority Data

Aug. 10, 2017 (CN) .......................... 201710682460.0

(51) Int. Cl.
H04W 72/04 (2009.01)
H04W 8/24 (2009.01)
(Continued)

(52) U.S. Cl.
CPC ............ H04W 8/245 (2013.01); H04W 76/11 (2018.02); H04W 76/12 (2018.02); H04W 76/15 (2018.02);
(Continued)

(58) Field of Classification Search
CPC ........................... H04W 72/04; H04W 88/085
See application file for complete search history.

(56) References Cited

U.S. PATENT DOCUMENTS

2018/0368109 A1* 12/2018 Kim .................. H04W 72/0433
2019/0260857 A1* 8/2019 Zhou ...................... H04L 69/22
(Continued)

FOREIGN PATENT DOCUMENTS

CN 103716885 A 4/2014
CN 106100800 A 11/2016
(Continued)

OTHER PUBLICATIONS

Ericsson et al: "Idle to Connected state transitions in a disaggregated gNB with EI interface", 3GPP Draft; R3-172553, 3rd Generation Partnership Project (3GPP), Mobile Competence Centre , 650, Route Des Lucioles , F-06921 Sophia-Antipolis Cedex , France, vol. RAN WG3, no. Qingdao; Jun. 27, 2017-Jun. 29, 2017 Jun. 20, 2017 (Jun. 20, 2017), XP051308121, Retrieved from the Internet: URL:http://www.3gpp.org/ftp/tsg ran/WG3 lu /TSGR3 AHGs/R3 AH NR 1706/Docs.
(Continued)

Primary Examiner — Barry W Taylor
(74) Attorney, Agent, or Firm — Foley & Lardner LLP (57) ABSTRACT Provided are a connection method, a configuration updating method, a control plane device and a user plane device. The method includes: transmitting, by a control plane device, a first request message for establishing a connection to a user plane device, where the first request message for establishing the connection includes information about the control plane device; and transmitting, by the user plane device, a first response message indicating that the connection is successfully established or a first response message indicating that the connection fails to be established to the control plane device, where the first response message indicating
(Continued)

that the connection is successfully established includes information about the user plane device, and the first response message indicating that the connection fails to be established includes the information about the user plane device and a reason why the connection fails to be established. Further provided is a storage medium.

14 Claims, 5 Drawing Sheets

(51) Int. Cl.
- *H04W 76/12* (2018.01)
- *H04W 76/15* (2018.01)
- *H04W 76/18* (2018.01)
- *H04W 76/11* (2018.01)
- *H04W 88/02* (2009.01)
- *H04W 88/08* (2009.01)

(52) U.S. Cl.
CPC ........... *H04W 76/18* (2018.02); *H04W 88/02* (2013.01); *H04W 88/08* (2013.01); *H04W 72/04* (2013.01); *H04W 88/085* (2013.01)

(56) References Cited

U.S. PATENT DOCUMENTS

| | | | | |
|---|---|---|---|---|
| 2019/0297652 | A1* | 9/2019 | Yang | H04W 76/10 |
| 2020/0275498 | A1* | 8/2020 | Fiorani | H04W 76/11 |
| 2020/0314945 | A1* | 10/2020 | Uchino | H04W 80/02 |
| 2020/0329365 | A1* | 10/2020 | Luo | H04W 24/04 |

FOREIGN PATENT DOCUMENTS

| | | |
|---|---|---|
| CN | 106162730 A | 11/2016 |
| CN | 106576217 A | 4/2017 |
| CN | 106686622 A | 5/2017 |
| CN | 106686666 A | 5/2017 |
| EP | 1757047 A1 | 2/2007 |

OTHER PUBLICATIONS

Ericsson et al: "TP for SgNB addition in disaggregated gNB with EI interface", 3GPP Draft; R3-172540, 3rd Generation Partnership Project (3GPP), Mobile Competence Centre , 650, Route Des Lucioles ; F-06921 Sophia-Antipolis Cedex , France, vol. RAN WG3, no. Qingdao; Jun. 27, 2017-Jun. 29, 2017 Jun. 19, 2017 (Jun. 19, 2017), XP051307848, Retrieved from the Internet: URL:http://www.3gpp.org/ftp/tsg ran/WG3 lu /TSGR3 AHGs/R3 AH NR 1706/Docs/- - [retrieved on Jun. 19, 2017].

Ericsson: "Interface stack and protocol functions", 3GPP DRAFT; R3-172541, 3rd Generation Partnership Project (3GPP), Mobile Competence Centre , 650, Route Des Lucioles ; F-06921 Sophia-Antipolis Cedex , France, vol. RAN WG3, no. Qingdao; Jun. 27, 2017-Jun. 29, 2017 Jun. 19, 2017 (Jun. 19, 2017), XP051307849, Retrieved from the Internet: URL:http://www.3gpp.org/ftp/tsg ran/WG3 lu/TSGR3 AHGs/R3 AH NR 1706/Docs/-.

Extended European Search Report for EP Appl. No. 18844617.3, dated Jun. 23, 2020.

Intel Corporation: "General principles of separation of CP and UP for high level functional split", 3GPP Draft; R3-172285-Separation of CP and UP for High Level Functional Split V4, 3rd Generation Partnership Project (3GPP), Mobile Competence Centre , 650, Route Des Lucioles ; F-06921 Sophia-Antipol, vol. RAN WG3, no. Qingdao, China; Jun. 26, 2017-Jun. 28, 2017 Jun. 19, 2017 (Jun. 19, 2017), XP051307803, Retrieved from the Internet: URL:http://www.3gpp.org/ftp/tsg ran/WG3 lu/TSGR3 AHGs/R3 AH NR 1706/.

International Search Report and Written Opinion for International Appl. No. PCT/CN2018/096513, dated Oct. 10, 2018.

* cited by examiner

FIG. 1

```
┌─────────────────────────────────────────────────────────────────────┐
│ A control plane device transmits a first request message for       │  ─── 201
│ establishing a connection to a user plane device, and the first    │
│ request message for establishing the connection includes           │
│ information about the control plane device                         │
└─────────────────────────────────────────────────────────────────────┘
                                    │
                                    ▼
┌─────────────────────────────────────────────────────────────────────┐
│ The user plane device transmits a first response message           │
│ indicating that the connection is successfully established or a    │
│ first response message indicating that the connection fails to be  │
│ established to the control plane device, where the first response  │  ─── 202
│ message indicating that the connection is successfully established │
│ includes information about the user plane device, and the first    │
│ response message indicating that the connection fails to be        │
│ established includes the information about the user plane device   │
│ and a reason why the connection fails to be established            │
└─────────────────────────────────────────────────────────────────────┘
```

CONNECTION METHOD, CONFIGURATION UPDATING METHOD, CONTROL PLANE DEVICE, AND USER PLANE DEVICE

CROSS REFERENCE TO RELATED APPLICATIONS

This application claims the benefit of priority under 35 U.S.C. § 120 as a continuation of PCT Patent Application No. PCT/CN2018/096513 filed on Jul. 20, 2018, which claims priority to Chinese Patent Application No. 201710682460.0 filed on Aug. 10, 2017, the disclosure of each of which is incorporated herein by reference in its entirety.

TECHNICAL FIELD

The present disclosure relates to, but is not limited to, the technical field of wireless communications and, in particular, relates to a connection establishment method, a control plane device and a user plane device.

BACKGROUND

With the advent of the 5G mobile communication era, massive connectivity higher data transmission rate requirements pose a great challenge on transmission capacity of a front haul network interface—a common public radio interface (CPRI) between a building baseband unit (BBU) and a remote radio unit (RRU) in the long term evolution (LTE) system. Since a CPRI interface transmits in-phase/quadrature (IQ) signals processed by physical layer encoding and modulation, and a corresponding digital bit stream rate is huge, the CPRI interface has a higher requirement for transmission latency and bandwidth. When a 5G air interface has an increased rate of tens of Gbps, the requirement for traffic of the CPRI interface will reach a Tbps level, which puts tremendous pressure on network deployment costs and difficulties.

SUMMARY

The present disclosure provides a connection method, a configuration updating method, a control plane device and a user plane device.

Solutions of the embodiments of the present disclosure are implemented as described below.

An embodiment of the present disclosure provides a connection method. The method includes:

transmitting, by a control plane device, a first request message for establishing a connection to a user plane device, and the first request message for establishing the connection includes information about the control plane device; and transmitting, by the user plane device, a first response message indicating that the connection is successfully established or a first response message indicating that the connection fails to be established to the control plane device, where the first response message indicating that the connection is successfully established includes information about the user plane device, and the first response message indicating that the connection fails to be established includes the information about the user plane device and a reason why the connection fails to be established.

An embodiment of the present disclosure further provides a connection method. The method includes:

transmitting, by a user plane device, a second request message for establishing a connection to a control plane device, where the second request message for establishing the connection includes information about the user plane device; and transmitting, by the control plane device, a second response message indicating that the connection is successfully established or a second response message indicating that the connection fails to be established to the user plane device, where the second response message indicating that the connection is successfully established includes information about the control plane device, and the second response message indicating that the connection fails to be established includes the information about the control plane device and a reason why the connection fails to be established.

An embodiment of the present disclosure further provides a configuration updating method. The method includes:

transmitting, by a user plane device, a capacity updating message, to a control plane device, where the capacity updating message includes information about the user plane device;

transmitting, by the control plane device, a capacity updating acknowledgement message or a capacity updating failure message to the user plane device, the capacity updating acknowledgement message includes information about the control plane device, the capacity updating failure message includes the information about the control plane device and a reason why the capacity updating fails.

An embodiment of the present disclosure further provides a control plane device. The control plane device includes a processor, a memory and a communication bus.

The communication bus is configured to implement connection communication between the processor and the memory.

The processor is configured to execute a connection program stored in the memory to implement the following steps:

transmitting a first request message for establishing a connection to a user plane device, where the first request message for establishing a connection includes information about the control plane device;

receiving a first response message indicating that the connection is successfully established or a first response message indicating that the connection fails to be established from the user plane device, where the first response message indicating that the connection is successfully established includes information about the user plane device, and the first response message indicating that the connection fails to be established includes the information about the user plane device and a reason why the connection fails to be established.

An embodiment of the present disclosure further provides a user plane device. The user plane device includes a processor, a memory and a communication bus.

The communication bus is configured to implement connection communication between the processor and the memory.

The processor is configured to execute a connection program stored in the memory to implement the following steps:

transmitting a second request message for establishing a connection to a control plane device, where the second request message for establishing a connection includes information about the user plane device;

receiving a second response message indicating that the connection is successfully established or a second response message indicating that the connection fails to be established from the control plane device, where the second response message indicating that the connection is successfully established includes information about the control plane device, and the second response message indicating that the connection fails to be established includes the information about the control plane device and a reason why the connection fails to be established.

An embodiment of the present disclosure further provides a user plane device. The user plane device includes a processor, a memory and a communication bus.

The communication bus is configured to implement connection communication between the processor and the memory.

The processor is configured to execute a connection program stored in the memory to implement the following steps:

transmitting a capacity updating message to a control plane device, where the capacity updating message includes information about the user plane device;
receiving a capacity updating acknowledgement message or a capacity updating failure message from the control plane device, the capacity updating acknowledgement message includes information about the control plane device, the capacity updating failure message includes the information about the control plane device and a reason why the capacity updating fails.

An embodiment of the present disclosure provides a computer storage medium. The computer storage medium is further configured to store computer-executable instructions, where, after being executed, the computer-executable instructions are capable of implementing the connection method or configuration updating method provided by one or more of technical solutions described above.

BRIEF DESCRIPTION OF DRAWINGS

The drawings described herein are used to provide a further understanding of the present disclosure, and form a part of the present application. The exemplary embodiments and descriptions thereof in the present disclosure are used to explain the present disclosure and do not limit the present disclosure in any improper way. In the drawings.

DETAILED DESCRIPTION

Objects, technical solutions and advantages of the present disclosure will be clearer from a detailed description of embodiments of the present disclosure in conjunction with the drawings. It is to be noted that if not in collision, the embodiments and features therein in the present disclosure may be combined with each other.

Figure 1:
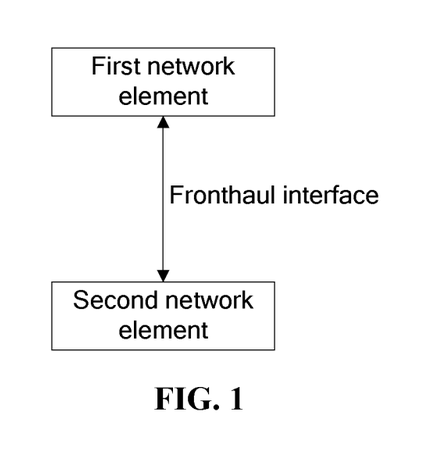
FIG. 1 is a structural diagram illustrating an interface between a first network element and a second network element in a 5G NR system.

In the 5G new radio (NR) system, the division of a front haul network interface needs to be redefined by comprehensively considering from transmission capacity, transmission latency, and deployment convenience. As shown in FIG. 1, in an non-ideal fronthaul network transmission, a latency-insensitive network function is placed in a first network element (e.g., a centralized unit (CU)), and a latency-sensitive network function is placed in a second network element (e.g., a distributed unit (DU)). The first network element and the second network element perform transmission through an ideal and/or non-ideal fronthaul network.

The 5G user service and the unbalanced user service physical distribution required by the different quality of service (QoS) have different requirements for network deployment and data transmission performance of the 5G network. These data services with different types are often interleaved, or exploded at a local hotspot area, so that the current relatively closed network architecture is unable to efficiently support various 5G communication scenarios. Although control plane (CP) and user plane (UP) function sets in the existing first network element are already divided by a logical layer, they are physically integrated in a single network element.

Therefore, on the basis of the division of the first network element and the second network element, the CP and the UP in the first network element are further physically divided by comprehensively considering from the transmission latency, load balancing, multi-manufacturer device interoperability and deployment cost, so that the CP and the UP is able to be deployed in different geographical positions, configured independently, and carried out resource expansion and function upgrading, thereby more flexibly and efficiently satisfying requirements of various 5G services.

From the perspective of deployment positions, a CP entity is able to be deployed in a network central office, such as a CU entity, multiple UP entities are managed in the district, and service load among the UP entities is efficiently coordinated to achieve a purpose of load balancing, also, the CP entity is able to be deployed at a position close to the DU entity on the edge of the network according to the requirements, so that signaling interaction latency of a radio resource control (RRC) control plane is able to be greatly reduced, fully satisfying requirements of low-latency services such as ultra-reliable and low latency communications (URLLC).

From the perspective of the operator, separation of the CP and the UP is able to construct a more flexible and efficient network deployment mode, which can further reduce the deployment cost while enhancing the network performance. Meanwhile, physical separation of the CP and the UP as well as the standardization of related interfaces greatly enhance the interoperability between the CP and UP devices, making it possible for CP entities and UP entities to adopt devices of different manufacturers, and also being beneficial for operators to further reduce the purchase cost of 5G infrastructure.

From the perspective of air interface user plane division, the CP entity includes RRC and a packet data convergence protocol-control (PDCP-C) processing layer for control plane signaling, and the UP entity includes a Service Data Adaptation Protocol (SDAP) and a packet data convergence protocol-user (PDCP-U) user plane data. A many-to-many mapping connection mode is able to be adopted between the CP and the UP, one CP can simultaneously manage multiple UPs, and resources provided by one UP can be shared by multiple CPs. Since many-to-many connection relationship exists between the CP and the UP, on one hand, how to implement establishment and configuration updating of the interface between the CP and the UP, such as by means of an operation administration and maintenance (OAM) platform or a network element other than the OAM platform, is not regulated in the existing art, and on the other hand, how to reduce signaling overhead and latency as much as possible and reduce the load of the front haul interface caused by large signaling overhead. In view of this, in the embodiments of the present disclosure, in a process of establishing the connection between the CP and the UP that are separated from each other, information of the CP and the UP will be carried. For example, the CP carries information about the control plane device of its own in a connection establishment request message. The information about the control plane device may include information about the user plane device for establishing the connection between the CU and the UP, also may include user plane equipment information not used for establishing the connection between the CU and the UP at this time. In this way, on one hand, the information about the user plane device may be used for the connection establishment or may not be used for the connection establishment. But after the CP knows the information about the user plane device of the UP, service data transmission of the UP plane may be controlled. For example, user plane control information may include: a UP ID that can be used for connection establishment between the CP and the UP, and also may include: UP bearer attributes (for example, whether the UP support duplication bearer capacity information, whether the UP support spilt bearer capacity information, whether the UP support radio packet data convergence protocol capacity), in this way, the CP can subsequently select service data that the CP may realize for the UP to bear and/or transmit according to these capacities. In this way, in the connection establishment request message, connection establishment response message (including a connection establishment failure response and a connection establishment success response), a capacity updating message, a capacity updating acknowledgment message or a capacity updating failure message used for the connection establishment or capacity updating, the information about the control plane device and the information about the user plane device are borne, implementing that one message bears multiple pieces of information. Compared with a dedicate signaling respectively transmitting connection establishment or capacity updating, and interactively controlling the information about the control plane device and the information about the user plane device, the signaling overhead is reduced, and the interaction of the information about the control plane device and the information about the user plane device that may be subsequently used during the connection establishment is completed. Therefore, when the message needs to be used, dedicate requests are not needed, and the latency for acquiring the information about the control plane device and the information about the user plane device is reduced. In addition, the CP or the UP has been performed on the configuration updating, which may in the CP and the UP configuration updating process through the capacity updating information synchronously enable the CP or the UP to be informed of the updated information about the control plane device and the information about the user plane device in time to reduce subsequent usage latency. So the solutions provided by the present disclosure have a small signaling overhead, and small usage latency of the control device information and the information about the user plane device.

Figure 2:
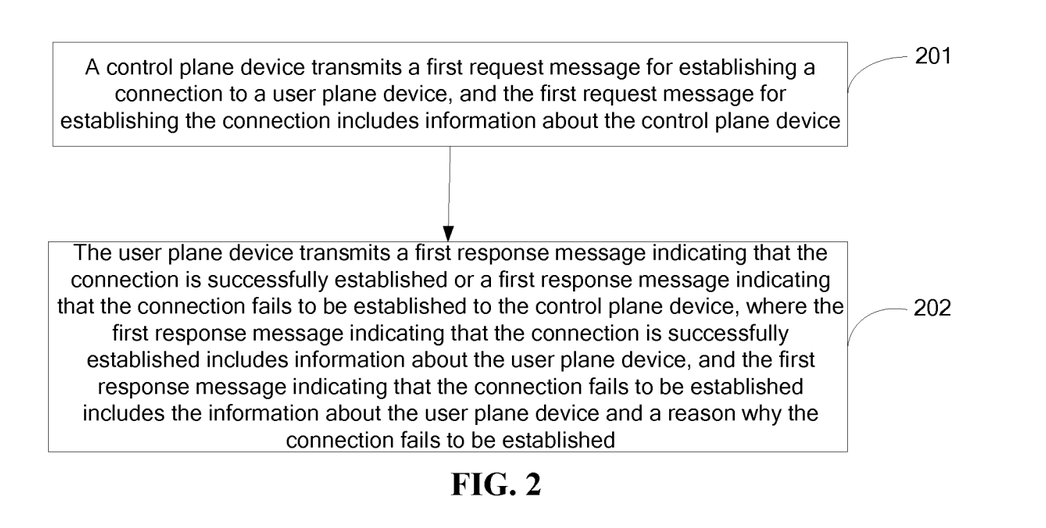
FIG. 2 is a flowchart of a connection method according to some embodiments of the present disclosure.

As shown in FIG. 2, a connection method of the present disclosure may include steps described below.

In step 201, a control plane device transmits a first request message for establishing a connection to a user plane device, and the first request message for establishing a connection includes information about the control plane device.

It is to be noted that before the step 201 the method further includes that:

the control plane device and the user plane device respectively acquire their own configuration information from an operation management maintenance platform, the configuration information of the control plane device includes the information about the control plane device; and the configuration information of the user plane device includes information about the user plane device.

In some embodiments, the information about the control plane device includes any one of or a combination of:
  an identification (ID) of the control plane device; and
  information about one or more internet protocol (IP) addresses for establishing an interface by the control plane device with the user plane device.

In some embodiments, the information about the user plane device includes any one of or a combination of:
  an ID of the user plane device;
  information about one or more IP addresses for establishing an interface by the user plane device with the control plane device; and
  capacity information of the user plane device.

In some embodiments, the capacity information of the user plane device includes any one of or a combination of:
  bandwidth information of the user plane device;
  a maximum number of UEs supported by the user plane device; and
  a maximum number of distributed processing units supported by the user plane device.

In some embodiments of the present disclosure, the bandwidth information of the user plane device includes information about data rate and frequency band bandwidth supported by the user plane device.

In some embodiments, the capacity information of the user plane device further includes any one of or a combination of:
  information about distributed processing units connected to the user plane device; information about control plane devices connected to the user plane device;

configuration information about public land mobile network (PLMN) supported by the user plane device;
configuration information about network slice supported by the user plane device;
version number information of a packet data convergence protocol for user plane data and a simple DFS access protocol supported by the user plane device; and
information about secure processing capacity supported by the user plane device.

In some embodiments of the present disclosure, the information about control plane devices connected to the user plane device includes any one of or a combination of: a list of control plane devices connected to the user plane device, and connection attribute information between the user plane devices and each control plane device.

In some embodiments of the present disclosure, the information about distributed processing units connected to the user plane device includes a list of distributed processing units connected to the user plane device and connection attribute information between the user plane device and each distributed processing unit.

In some embodiments, the connection attribute information includes any one of or a combination of:
a connection bandwidth;
a supported rate; and
a connection delay.

In some embodiments of the present disclosure, the configuration information about the PLMN supported by the user plane device includes type information about the PLMN supported by the user plane device and resource quota information occupied by each PLMN type.

In some embodiments of the present disclosure, the configuration information about the slice supported by the user plane device includes type information about the slice supported by the user plane device and resource quota information occupied by each slice type.

In some embodiments, the information about secure processing capacity supported by the user plane device includes, but not limited to, information of an encryption algorithm, an integrity protection algorithm and a header compression algorithm supported by the user plane device.

The capacity information of the user plane device further includes information about functions supported by the user plane device, the information about functions includes any one of or a combination of the following:
information regarding whether duplication bearer is supported;
information regarding whether split bearer is supported;
information regarding whether secondary cell group (SCG) split bearer is supported;
information about supported radio access technology (RAT) type;
information regarding whether NR PDCP is supported; and
information regarding whether jumbo frame is supported.

In step 202, the user plane device transmits a first response message indicating that the connection is successfully established or a first response message indicating that the connection fails to be established to the control plane device, where the first response message indicating that the connection is successfully established includes information about the user plane device, and the first response message indicating that the connection fails to be established includes the information about the user plane device and a reason why the connection fails to be established.

Figure 3:
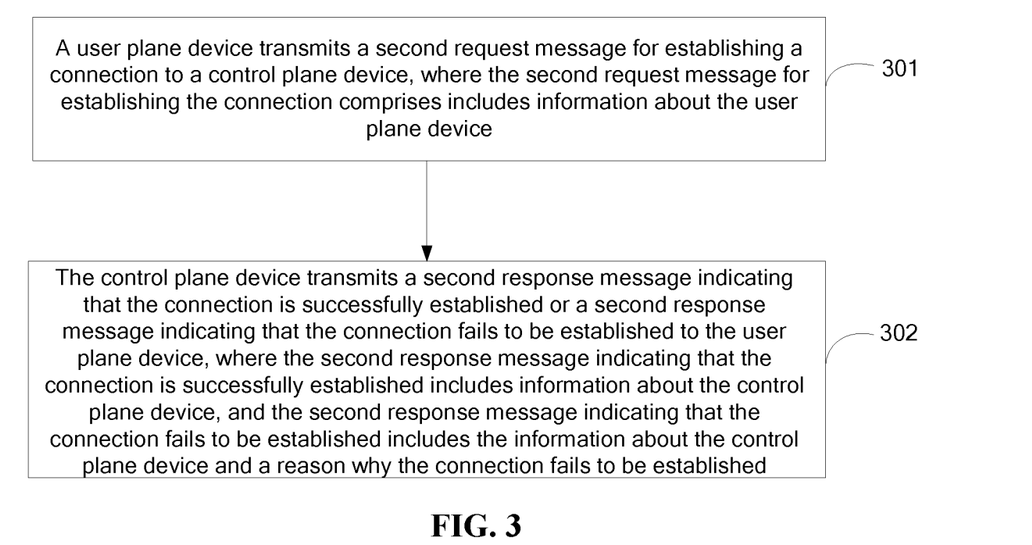
FIG. 3 is a flowchart of a connection method according to an embodiment of the present disclosure.

As shown in FIG. 3, a connection method of the present disclosure may include steps described below.

In step 301, a user plane device transmits a second request message for establishing a connection to a control plane device, where the second request message for establishing the connection includes information about the user plane device.

It is to be noted that before the step 301 the method further includes that:
the control plane device and the user plane device respectively acquire their own configuration information from an operation management maintenance platform, the configuration information of the control plane device includes information about the control plane device; and the configuration information of the user plane device includes information about the user plane device.

In some embodiments, contents of the information about the control plane device are the same as that described in step 201, and thus will not be described herein.

In some embodiments, contents of the information about the user plane device are the same as that described in step 201, and thus will not be described herein.

In step 302, the control plane device transmits a second response message indicating that the connection is successfully established or a second response message indicating that the connection fails to be established to the user plane device, where the second response message indicating that the connection is successfully established includes information about the control plane device, and the second response message indicating that the connection fails to be established includes the information about the control plane device and a reason why the connection fails to be established.

Figure 4:
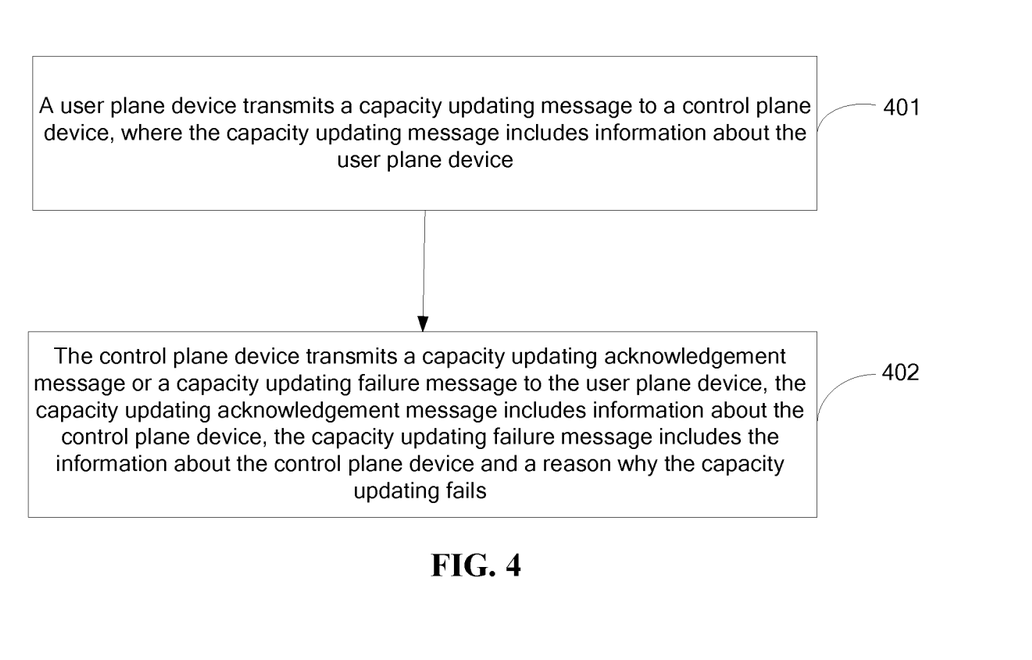
FIG. 4 is a flowchart of a configuration updating method according to some embodiments of the present disclosure.

As shown in FIG. 4, a configuration updating method of the present disclosure may include steps described below.

In step 401, a user plane device transmits a capacity updating message to a control plane device, where the capacity updating message includes information about the user plane device.

It is to be noted that before step 401 the method further includes that:
the control plane device and the user plane device respectively acquire their own configuration information from an operation management maintenance platform, the configuration information of the control plane device includes information about the control plane device; and the configuration information of the user plane device includes information about the user plane device; and
a connection is established between the control plane device and the user plane device (a request for establishing a connection may be initiated by the control plane device or the user plane device).

In some embodiments, contents of the information about the control plane device are the same as that described in step 201, and thus will not be described herein.

In some embodiments, contents of the information about the user plane device are the same as that described in step 201, and thus will not be described herein.

In step 402, the control plane device transmits a capacity updating acknowledgement message or a capacity updating failure message to the user plane device, the capacity updating acknowledgement message includes information about the control plane device, the capacity updating failure message includes the information about the control plane device and a reason why the capacity updating fails.

An embodiment of the present disclosure further provides a connection method. The method includes:

transmitting, by a control plane device, a first request message for establishing a connection to a user plane device, and the first request message for establishing the connection includes information about the control plane device; and receiving, by the control plane device, a first response message indicating that the connection is successfully established or a first response message indicating that the connection fails to be established from the user plane device, where the first response message indicating that the connection is successfully established includes information about the user plane device, and the first response message indicating that the connection fails to be established includes the information about the user plane device and a reason why the connection fails to be established.

In some embodiments, contents of the information about the control plane device are the same as that described in step 201, and thus will not be described herein.

In some embodiments, contents of the information about the user plane device are the same as that described in step 201, and thus will not be described herein.

An embodiment of the present disclosure further provides a connection method. The method includes:

transmitting, by a user plane device, a second request message for establishing a connection to a control plane device, where the second request message for establishing the connection includes information about the user plane device; and receiving, by the user plane device, a second response message indicating that the connection is successfully established or a second response message indicating that the connection fails to be established from the control plane device, where the second response message indicating that the connection is successfully established includes information about the control plane device, and the second response message indicating that the connection fails to be established includes the information about the control plane device and a reason why the connection fails to be established.

In some embodiments, contents of the information about the control plane device are the same as that described in step 201, and thus will not be described herein.

In some embodiments, contents of the information about the user plane device are the same as that described in step 201, and thus will not be described herein.

An embodiment of the present disclosure further provides a configuration updating method. The method includes:

transmitting, by a user plane device, a capacity updating message, to a control plane device, where the capacity updating message includes information about the user plane device;

receiving, by the user plane device, a capacity updating acknowledgement message or a capacity updating failure message from the control plane device, the capacity updating acknowledgement message includes information about the control plane device, the capacity updating failure message includes the information about the control plane device and a reason why the capacity updating fails.

In some embodiments, contents of the information about the control plane device are the same as that described in step 201, and thus will not be described herein.

In some embodiments, contents of the information about the user plane device are the same as that described in step 201, and thus will not be described herein.

An embodiment of the present disclosure further provides a control plane device. The control plane device includes a processor, a memory and a communication bus.

The communication bus is configured to implement connection communication between the processor and the memory.

The processor is configured to execute a connection program stored in the memory to implement the following steps:

transmitting a first request message for establishing a connection to a user plane device, where the first request message for establishing the connection includes information about the control plane device; and receiving a first response message indicating that the connection is successfully established or a first response message indicating that the connection fails to be established from the user plane device, where the first response message indicating that the connection is successfully established includes information about the user plane device, and the first response message indicating that the connection fails to be established includes the information about the user plane device and a reason why the connection fails to be established.

In some embodiments, contents of the information about the control plane device are the same as that described in step 201, and thus will not be described herein.

In some embodiments, contents of the information about the user plane device are the same as that described in step 201, and thus will not be described herein.

An embodiment of the present disclosure further provides a user plane device. The user plane device includes a processor, a memory and a communication bus.

The communication bus is configured to implement connection communication between the processor and the memory.

The processor is configured to execute a connection program stored in the memory to implement the following steps:

transmitting a second request message for establishing a connection to a control plane device, where the second request message for establishing the connection includes information about the user plane device; and receiving a second response message indicating that the connection is successfully established or a second response message indicating that the connection fails to be established from the control plane device, where the second response message indicating that the connection is successfully established includes information about the control plane device, and the second response message indicating that the connection fails to be established includes the information about the control plane device and a reason why the connection fails to be established.

In some embodiments, contents of the information about the control plane device are the same as that described in step 201, and thus will not be described herein.

In some embodiments, contents of the information about the user plane device are the same as that described in step 201, and thus will not be described herein.

An embodiment of the present disclosure further provides a user plane device. The user plane device includes a processor, a memory and a communication bus.

The communication bus is configured to implement connection communication between the processor and the memory.

The processor is configured to execute a connection program stored in the memory to implement the following steps:

transmitting a capacity updating message to a control plane device, where the capacity updating message includes information about the user plane device; and receiving a capacity updating acknowledgement message or a capacity updating failure message from the control plane device, the capacity updating acknowledgement message includes information about the control plane device, the capacity updating failure message includes the information about the control plane device and a reason why the capacity updating fails.

In some embodiments, contents of the information about the control plane device are the same as that described in step 201, and thus will not be described herein.

In some embodiments, contents of the information about the user plane device are the same as that described in step 201, and thus will not be described herein.

Figure 5:
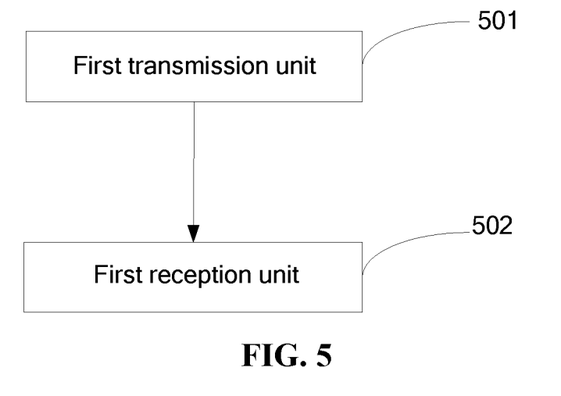
FIG. 5 is a structural diagram illustrating a control plane device according to an embodiment of the present disclosure.

As shown in FIG. 5, an embodiment of the present disclosure further provides a control plane device. The control plane device includes a first transmission unit 501 and a first reception unit 502.

The first transmission unit 501 is configured to transmit a first request message for establishing a connection to a user plane device, where the first request message for establishing the connection includes information about the control plane device.

The first reception unit 502 is configured to receive a first response message indicating that the connection is successfully established or a first response message indicating that the connection fails to be established from the user plane device, where the first response message indicating that the connection is successfully established includes information about the user plane device, and the first response message indicating that the connection fails to be established includes the information about the user plane device and a reason why the connection fails to be established.

In some embodiments, the first reception unit 502 is further configured to:

acquire configuration information about the control plane device from an operation management maintenance platform, the configuration information about the control plane device includes information about the control plane device.

In some embodiments, the information about the control plane device includes any one of or a combination of:

an ID of the control plane device; and information about one or more IP addresses for establishing an interface by the user plane device with the control plane device.

In some embodiments, the information about the user plane device includes any one of or a combination of:

an ID of the user plane device;

information about one or more IP addresses for establishing an interface by the user plane device with the control plane device; and capacity information of the user plane device.

In some embodiments, the capacity information of the user plane device includes any one of or a combination of:

bandwidth information of the user plane device;

a maximum number of UEs supported by the user plane device; and a maximum number of distributed processing units supported by the user plane device.

In some embodiments of the present disclosure, the bandwidth information of the user plane device includes information about data rate and frequency band bandwidth supported by the user plane device.

In some embodiments, the capacity information of the user plane device includes any one of or a combination of:

information about distributed processing units connected to the user plane device;

information about control plane devices connected to the user plane device;

configuration information about the PLMN supported by the user plane device;

configuration information about the slice supported by the user plane device;

version number information of a PDCP for user plane data and a SDAP supported by the user plane device; and information about secure processing capacity supported by the user plane device.

In some embodiments of the present disclosure, the information about the control plane device connected to the user plane device includes at least one of: a list of control plane devices connected to the user plane device, and connection attribute information between the user plane device and each control plane device.

In some embodiments of the present disclosure, the information about distributed processing units connected to the user plane device includes a list of distributed processing units connected to the user plane device and connection attribute information between the user plane device and each distributed processing unit.

In some embodiments, the connection attribute information includes any one of or a combination of:

a connection bandwidth;

a supported rate; and a connection delay.

In some embodiments of the present disclosure, the configuration information about the PLMN supported by the user plane device includes Type information about the PLMN supported by the user plane device and resource quota information occupied by each PLMN type.

In some embodiments of the present disclosure, the configuration information about the slice supported by the user plane device includes type information about the slice supported by the user plane device and resource quota information occupied by each slice type.

In some embodiments, the information about secure processing capacity supported by the user plane device includes, but not limited to, information of an encryption algorithm, an integrity protection algorithm and a header compression algorithm supported by the user plane device.

In some embodiments, the capacity information of the user plane device further includes information about functions supported by the user plane device, the information about functions includes any one of or a combination of:

information regarding whether duplication bearer is supported;

information regarding whether split bearer is supported;

information regarding whether SCG split bearer is supported;

type information of supported RAT;

information regarding whether NR PDCP is supported; and information regarding whether jumbo frame is supported.

Figure 6:
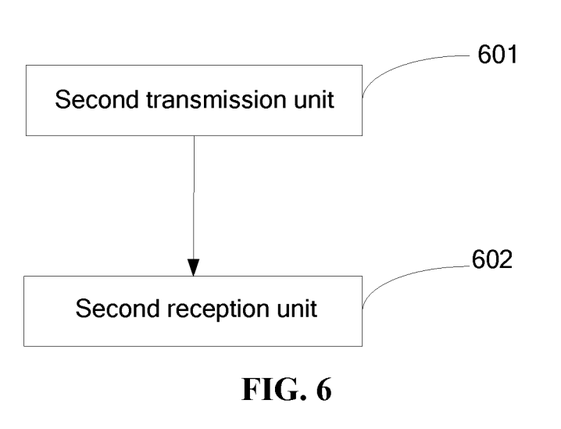
FIG. 6 is a structural diagram illustrating a user plane device according to some embodiments of the present disclosure.

As shown in FIG. 6, an embodiment of the present disclosure further provides a user plane device. The user plane device includes a second transmission unit 601 and a second reception unit 602.

The second transmission unit 601 is configured to transmit a second request message for establishing a connection to a control plane device, where the second request message for establishing the connection includes information about the user plane device;

The second reception unit 602 is configured to receive a second response message indicating that the connection is successfully established or a second response message indicating that the connection fails to be established from the control plane device, where the second response message indicating that the connection is successfully established includes information about the control plane device, and the second response message indicating that the connection fails to be established includes the information about the control plane device and a reason why the connection fails to be established.

It is to be noted that the second reception unit 602 is further configured to:
acquire configuration information of the user plane device from an operation management maintenance platform, the configuration information of the user plane device includes information about the user plane device.

In some embodiments, contents of the information about the control plane device are the same as that described above, and thus will not be described herein.

In some embodiments, contents of the information about the user plane device are the same as that described above, and thus will not be described herein.

Figure 7:
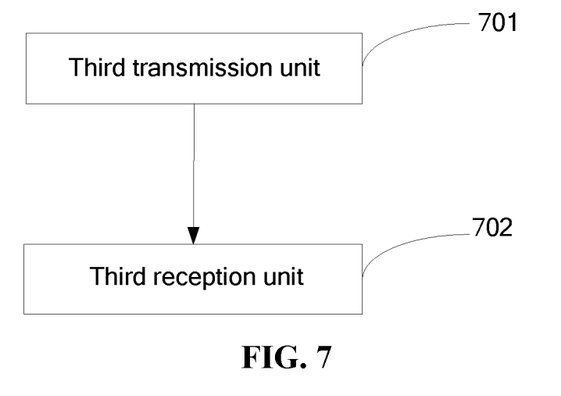
FIG. 7 is a structural diagram illustrating a user plane device according to an embodiment of the present disclosure.

As shown in FIG. 7, the present disclosure further provides a user plane device. The user plane device includes a third transmission unit 701 and a third reception unit 702.

The third transmission unit 702 is configured to transmit a capacity updating message to a control plane device, where the capacity updating message includes information about the user plane device.

The third reception unit 702 is configured to receive a capacity updating acknowledgement message or a capacity updating failure message from the control plane device, the capacity updating acknowledgement message includes information about the control plane device, the capacity updating failure message includes the information about the control plane device and a reason why the capacity updating fails.

It is to be noted that the third transmission unit 701 is configured to transmit a second request message for establishing a connection to the control plane device, where the second request message for establishing the connection includes information about the user plane device.

The third reception unit 702 is further configured to acquire configuration information of the user plane device from an operation management maintenance platform, the configuration information of the user plane device includes information about the user plane device; receive a second response message indicating that the connection is successfully established or a second response message indicating that the connection fails to be established from the control plane device, where the second response message indicating that the connection is successfully established includes information about the control plane device, and the second response message indicating that the connection fails to be established includes the information about the control plane device and a reason why the connection fails to be established.

In some embodiments, contents of the information about the control plane device are the same as that described above, and thus will not be described herein.

In some embodiments, contents of the information about the user plane device are the same as that described above, and thus will not be described herein.

The embodiments of the present disclosure further provide several examples to further explain the present disclosure. It is to be noted that the examples are just better illustrate the present disclosure and do not limit the present disclosure in any improper way. The following embodiments are disposed separately, and technical features of different embodiments may be combined into one embodiment for joint use. Names of the first request message for establishing a connection, the second request message for establishing a connection, the first response message indicating that the connection is successfully established, the first response message indicating that the connection fails to be established, the second response message indicating that the connection is successfully established, the second response message indicating that the connection fails to be established, the capacity updating message, the capacity updating acknowledgment message or the capacity updating failure message may be changed without affecting the implementation of the method in the present disclosure.

Figure 8:
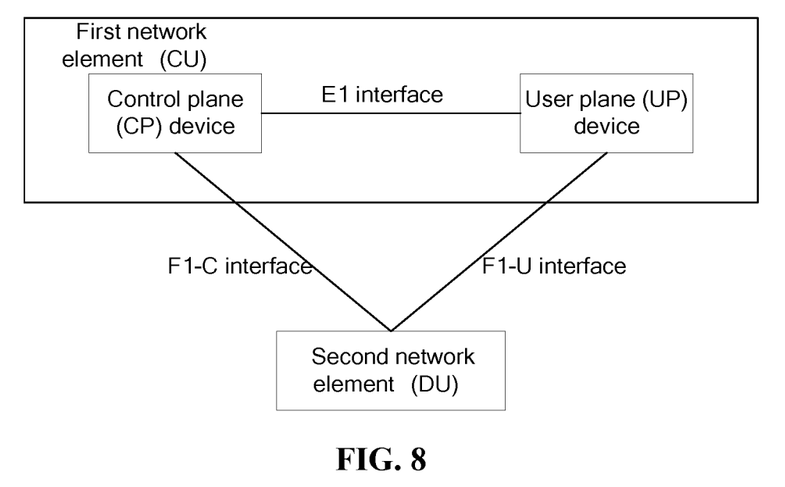
FIG. 8 is a structural diagram illustrating interfaces between a control plane device, a user plane device and a second network element according to an embodiment of the present disclosure.

FIG. 8 is a structural diagram illustrating interfaces between a control plane device (CP) of a first network element, a user plane device (UP) of the first network element and a second network element according to an embodiment of the present disclosure. The CP and UP are respectively located in two different CUs of the first network element, implementing the separation of user plane data and control plane data. For ease of description, an interface between the CP device of the first network element and the second network element is an F1-C interface, an interface between the UP device of the first network element and the second network element is an F1-U interface, an interface between the CP and the UP is an E1 interface.

Example 1

Figure 9:
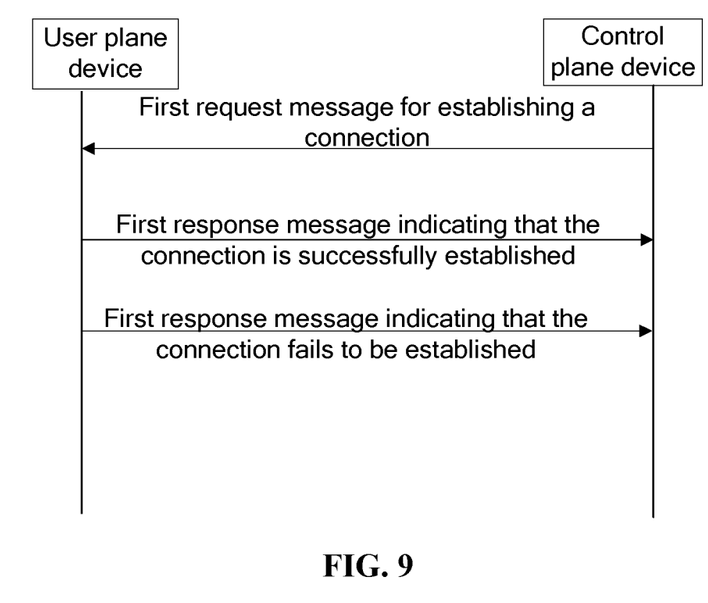
FIG. 9 is a flowchart illustrating a request, initiated by a control plane device, for establishing a connection with a user plane device according to an embodiment of the present disclosure.

FIG. 9 is a flowchart illustrating a request, initiated by a CP, for establishing a connection with a UP according to an embodiment of the present disclosure.

The direction of a first request message for establishing a connection is CP→UP.

A source CP transmits the first request message for establishing the connection to the UP, the message includes, but is not limited to the following:
identification information of the source CP.

The direction of a first response message indicating that the connection is successfully established is UP→CP.

After receiving the first request message for establishing the connection from the CP, a target UP transmits the first response message indicating that the connection is successfully established to the CP, the message includes, but is not limited to the following:
identification information of the target UP; and
capacity information of the target UP.

The capacity information of the UP includes, but is not limited to the following:
bandwidth information of the UP;
a maximum number of UEs supported by the UP;
a maximum number of DUs supported by the UP;
a list of DUs connected to the UP and connection attribute information between the target UP and each DU, which includes, but is not limited to information such as latency and bandwidth.
a list of CPs connected to the UP and connection attribute information between the target UP and each CP, which includes, but is not limited to information such as latency and bandwidth;

configuration information related to the PLMN supported by the UP, the information includes, but not limited to: type information of the PLMN and resource quota information occupied by each PLMN;

configuration information related to the slice supported by the UP, the information includes, but not limited to: type information of a slice and resource quota information occupied by each slice;

version number information of a PDCP-U and a SDAP supported by the UP;

secure processing capacity supported by the UP, the secure processing capacity includes, but not limited to information of an encryption algorithm, an integrity protection algorithm and a header compression algorithm;

support information for other optional functions, the support information includes, but not limited to, information regarding whether duplication bearer is supported.

The direction of the first response message indicating that the connection fails to be established is UP→CP.

After receiving the first request message for establishing the connection from the CP, the target UP transmits the first response message indicating that the connection fails to be established to the CP, the message includes, but is not limited to the following:

IP address information of the target UP; and a failure reason.

Example 2

Figure 10:
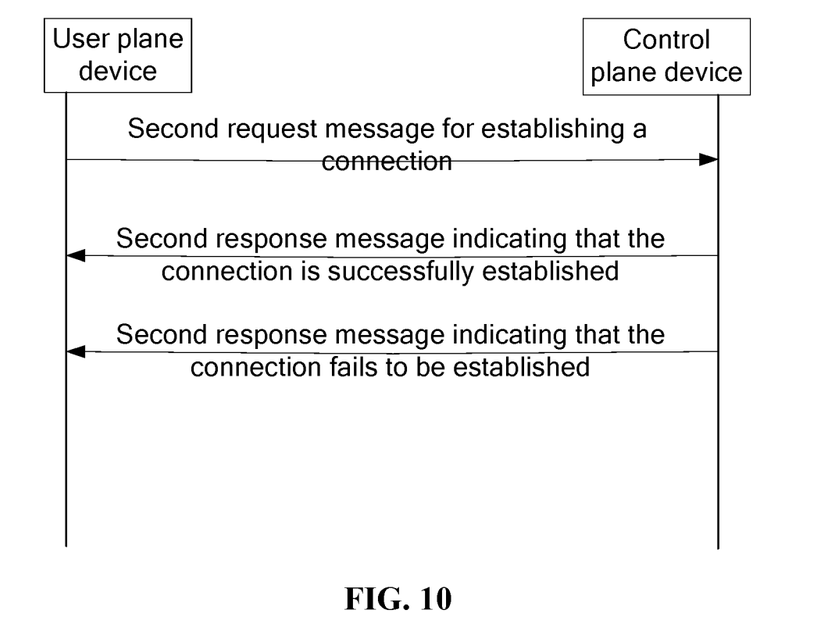
FIG. 10 is a flowchart illustrating a request, initiated by a user plane device, for establishing a connection with a control plane device according to an embodiment of the present disclosure.

FIG. 10 is a flowchart illustrating a request, initiated by a UP, for establishing a connection with a CP according to an embodiment of the present disclosure.

The direction of the second request message for establishing the connection is UP→CP.

A source UP transmits the second request message for establishing the connection to the CP, the message includes, but is not limited to the following:

identification information of the source UP; and capacity information of the source UP.

The capacity information of the UP includes, but is not limited to the following:

bandwidth information of the UP;

a maximum number of UEs supported by the UP;

a maximum number of DUs supported by the UP;

a list of DUs connected to the UP and connection attribute information between the source UP and each DU, which includes, but is not limited to information such as latency and bandwidth.

a list of CPs connected to the UP and connection attribute information between the source UP and each CP, which includes, but is not limited to information such as latency and bandwidth;

configuration information related to the PLMN supported by the UP, the information includes, but not limited to: type information of the PLMN and resource quota information occupied by each PLMN;

configuration information related to the slice supported by the UP, the information includes, but not limited to: type information of the slice and resource quota information occupied by each slice;

version number information of a PDCP-U and a SDAP supported by the UP;

secure processing capacity supported by the UP, the secure processing capacity includes, but not limited to information of an encryption algorithm, an integrity protection algorithm and a header compression algorithm;

support information for other optional functions, the support information includes, but not limited to, information regarding whether duplication bearer is supported.

The direction of the second response message indicating that the connection is successfully established is CP→UP.

After receiving the second request message for establishing the connection from the UP, the target CP transmits the second response message indicating that the connection is successfully established to the UP, the message includes, but is not limited to the following:

identification information of the target CP;

The direction of the second response message indicating that the connection fails to be established is CP→UP.

After receiving the second request message for establishing the connection from the UP, the target CP transmits the second response message indicating that the connection fails to be established to the UP, the message includes, but is not limited to the following:

identification information of the target CP; and a failure reason.

Example 3

Figure 11:
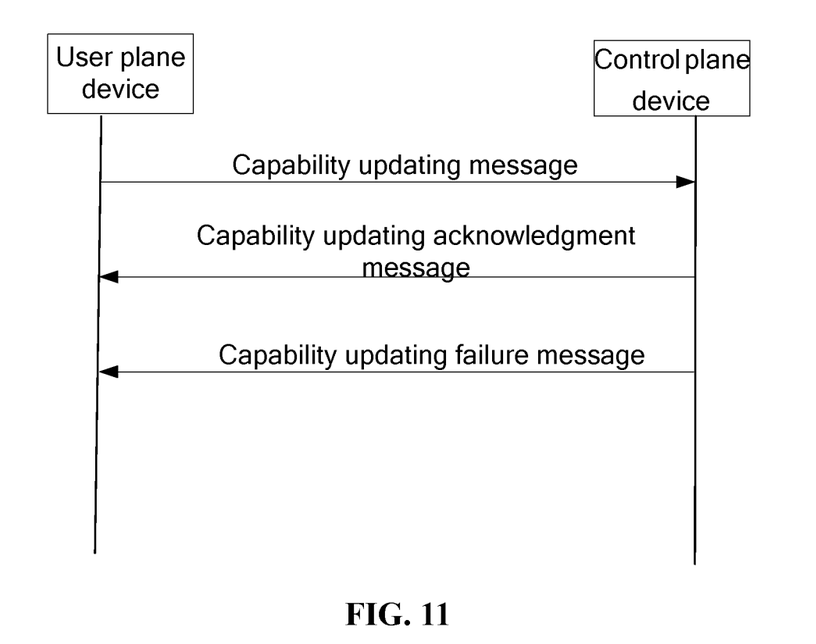
FIG. 11 is a flowchart illustrating a configuration updating request initiated by a user plane device according to an embodiment of the present disclosure.

FIG. 11 is a flowchart illustrating configuration updating of UP implemented between a CP and the UP according to an embodiment of the present disclosure.

The direction of a capacity updating message is UP→CP.

When interface configuration updating is needed, a source UP transmits a capacity updating message to all CPs in the list of CPs currently connected to the source UP, the message includes but is not limited to the following:

identification information of the source UP; and capacity updating information updated of the source UP;

The capacity updating information of the UP includes, but is not limited to the following:

bandwidth information of the source UP;

a maximum number of UEs supported by the source UP;

a maximum number of DUs supported by the source UP;

a list of DUs connected to the source UP and connection attribute information between the source UP and each DU, which includes, but is not limited to information such as latency and bandwidth;

a list of CPs connected to the source UP and connection attribute information between the source UP and each CP, which includes, but is not limited to information such as latency and bandwidth;

configuration information related to the PLMN supported by the source UP, the information includes, but not limited to: type information of the PLMN and resource quota information occupied by each PLMN;

configuration information related to the slice supported by the source UP, the information includes, but not limited to: type information of the slice and resource quota information occupied by each slice;

version number information of a PDCP-U and a SDAP supported by the source UP;

secure processing capacity supported by the source UP, the secure processing capacity includes, but not limited to information of an encryption algorithm, an integrity protection algorithm and a header compression algorithm;

support information for other optional functions, the support information includes, but not limited to, information regarding whether duplication bearer is supported.

The direction of a capacity updating acknowledgement message is CP→UP.

After receiving the capacity updating message from the UP, the target CP transmits the capacity updating acknowledgment message to the UP, the message includes, but is not limited to the following:

identification information of the target CP;

The direction of a capacity updating failure message is CP→UP.

After a target CP receives the capacity updating message from the UP, transmits the capacity updating failure message to the UP, the message includes, but is not limited to the following:

identification information of the target CP;

a failure reason.

An embodiment of the present disclosure provides a computer storage medium. The computer storage medium is further configured to store computer-executable instructions, where, after being executed, the computer-executable instructions are capable of implementing the connection method or configuration updating method provided by one or more of technical solutions described above.

The computer storage medium provided by this embodiment may be various types of storage mediums, such as a read only storage medium, a flash memory and a random storage medium.

In some embodiments, the storage medium may include a non-transitory storage medium.

In the present disclosure, the features of the various embodiments, if not in collision, may be combined with each other. Each embodiment is only an optimal implementation mode of the present disclosure, and is not intended to limit the scope of the present disclosure.

It will be understood by those of ordinary skill in the art that all or part of the steps in the method described above may be implemented by related hardware instructed by one or more programs, and these programs may be stored in a computer-readable storage medium such as a ROM, a magnetic disk, an optical disk or the like. Optionally, all or part of the steps in the embodiments described above may also be implemented by using one or more integrated circuits. Accordingly, the modules/units in the embodiments described above may be implemented by a hardware or a software function module. The present disclosure is not limited to any specific combination of hardware and software.

The above are only examples of the present disclosure and are not intended to limit the present disclosure, and for those skilled in the art, the present disclosure may have various modifications and variations. Any modifications, equivalent substitutions, improvements and the like made within the spirit and principle of the present disclosure fall within the scope of the present disclosure.

What is claimed is:

1. A connection method, comprising:
    transmitting, by a control plane of a centralized unit, a request message for establishing a connection to a user plane of the centralized unit, wherein the request message comprises first information corresponding to the control plane; and
    receiving, by the control plane from the user plane, a response message indicating that the connection has been successfully established, wherein the response message comprises second information corresponding to the user plane, the second information including:
        an identification (ID) of the user plane;
        configuration information about a public land mobile network supported by the user plane; and
        configuration information about a network slice supported by the user plane.

2. The connection method of claim 1, wherein the first information corresponding to the control plane comprises:
    an identification (ID) of the control plane.

3. The connection method of claim 1, wherein the response message indicates that the connection fails to be established, the response message comprising third information of a reason why the connection fails to be established.

4. The connection method of claim 1, wherein the second information corresponding to the user plane further comprises:
    information regarding whether duplication bearer capacity is supported;
    information regarding whether split bearer capacity is supported;
    information regarding whether split bearer capacity of a secondary cell group is supported; type information of supported radio access technology;
    information regarding whether new radio packet data convergence protocol capacity is supported; and
    information regarding whether jumbo frame is supported.

5. The connection method of claim 1, wherein the second information corresponding to the user plane further comprises:
    bandwidth information of the user plane;
    a maximum number of user equipment (UE) devices supported by the user plane; and
    a maximum number of distributed units supported by the user plane, the distributed units corresponding to the centralized unit.

6. The connection method of claim 5, the bandwidth information of the user plane comprises information about data rate and frequency band bandwidth supported by the user plane.

7. A connection method, comprising:
    transmitting, by a user plane of a centralized unit, a request message for establishing a connection to a control plane of the centralized unit, wherein the request message comprises first information corresponding to the user plane;
    receiving, by the user plane from the control plane, a response message indicating that the connection has been successfully established, wherein the response message comprises second information corresponding to the control plane, the second information including an identification (ID) of the control plane;
    transmitting, by the user plane, a capacity updating message to the control plane, wherein the capacity updating message comprises the first information corresponding to the user plane; and
    receiving, by the user plane from the control plane, a capacity updating acknowledgement message or a capacity updating failure message,
    wherein the first information corresponding to the user plane includes:
        an identification (ID) of the user plane;
        configuration information about a public land mobile network supported by the user plane; and
        configuration information about a network slice supported by the user plane.

8. A control plane device, comprising a processor, a memory and a communication bus;
   wherein the communication bus is configured to implement connection communication between the processor and the memory;
   the processor is configured to execute a connection program stored in the memory to implement the following steps:
   transmitting a request message for establishing a connection to a user plane device, wherein the request message comprises first information corresponding to the control plane device; and
   receiving, from the user plane device, a response message indicating that the connection has been successfully established, wherein the response message comprises second information corresponding to the user plane device, the second information including:
      an identification (ID) of the user plane device;
      configuration information about a public land mobile network supported by the user plane device; and
      configuration information about a network slice supported by the user plane device.

9. The control plane device of claim 8, wherein the first information corresponding to the control plane device comprises:
   an identification (ID) of the control plane device.

10. The control plane device of claim 8, wherein the response message indicates that the connection fails to be established, the response message comprising third information of a reason why the connection fails to be established.

11. The control plane device of claim 8, wherein the second information corresponding to the user plane device further comprises:
   information regarding whether duplication bearer capacity is supported;
   information regarding whether split bearer capacity is supported;
   information regarding whether split bearer capacity of a secondary cell group is supported; type information of supported radio access technology;
   information regarding whether new radio packet data convergence protocol capacity is supported; and
   information regarding whether jumbo frame is supported.

12. The control plane device of claim 8, wherein the second information corresponding to the user plane device further comprises:
   bandwidth information of the user plane device;
   a maximum number of user equipment (UE) devices supported by the user plane device; and
   a maximum number of distributed units supported by the user plane device, the distributed units corresponding to the centralized unit.

13. The control plane device of claim 12, the bandwidth information of the user plane device comprises information about data rate and frequency band bandwidth supported by the user plane device.

14. A user plane device, comprising a processor, a memory and a communication bus;
   wherein the communication bus is configured to implement connection communication between the processor and the memory;
   the processor is configured to execute a connection program stored in the memory to implement the following steps:
   transmitting a request message for establishing a connection to a control plane device, wherein the request message comprises first information corresponding to the user plane device;
   receiving, from the control plane device, a response message indicating that the connection has been successfully established, wherein the response message comprises second information corresponding to the control plane device, the second information including an identification (ID) of the control plane device;
   transmitting a capacity updating message to the control plane device, wherein the capacity updating message comprises the first information corresponding to the user plane device; and
   receiving, from the control plane device, a capacity updating acknowledgement message or a capacity updating failure message,
   wherein the first information corresponding to the user plane device includes:
      an identification (ID) of the user plane device;
      configuration information about a public land mobile network supported by the user plane device; and
      configuration information about a network slice supported by the user plane device.

* * * * *